United States Patent
He (10) Patent No.: US 11,295,332 B2
(45) Date of Patent: Apr. 5, 2022

(54) METHOD AND APPARATUS OF DEEP REINFORCEMENT LEARNING FOR MARKETING COST CONTROL

(71) Applicant: Advanced New Technologies Co., Ltd., Grand Cayman (KY)

(72) Inventor: Jianshan He, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/083,087

(22) Filed: Oct. 28, 2020

(65) Prior Publication Data

US 2021/0117999 A1     Apr. 22, 2021

Related U.S. Application Data

(63) Continuation of application No. PCT/CN2019/091818, filed on Jun. 19, 2019.

(30) Foreign Application Priority Data

Aug. 7, 2018 (CN) .......................... 201810893028.0

(51) Int. Cl.
*G06Q 30/00* (2012.01)
*G06Q 30/02* (2012.01)
(Continued)

(52) U.S. Cl.
CPC ........... *G06Q 30/0206* (2013.01); *G06N 3/04* (2013.01); *G06N 3/08* (2013.01); *G06Q 10/0637* (2013.01);
(Continued)

(58) Field of Classification Search
None
See application file for complete search history.

(56) References Cited

U.S. PATENT DOCUMENTS

| 2005/0071223 A1* | 3/2005 | Jain ................... G06Q 30/0235 705/14.13 |
| 2007/0043616 A1* | 2/2007 | Kutaragi ............ G06Q 30/0252 705/14.68 |

(Continued)

FOREIGN PATENT DOCUMENTS

| CN | 106296278 | 1/2017 |
| CN | 106339897 | 1/2017 |

(Continued)

OTHER PUBLICATIONS

Zhao, Xiangyu, et al. "'Deep reinforcement learning for search, recommendation, and online advertising: a survey" by Xiangyu Zhao, Long Xia, Jiliang Tang, and Dawei Yin with Martin Vesely as coordinator." ACM SIGWEB Newsletter Spring (2019): 1-15. (Year: 2019).*

(Continued)

*Primary Examiner* — Michael Bekerman
(74) *Attorney, Agent, or Firm* — Fish & Richardson P.C.

(57) ABSTRACT

Embodiments of the present specification provide methods for performing marketing cost control by using a deep reinforcement learning system. One method includes the following: determining a cost of a marketing activity; determining a reward score of reinforcement learning that is negatively correlated with the cost; and returning the reward score to a smart agent of a deep reinforcement learning system, for the smart agent to update a marketing strategy, wherein the smart agent is configured to determine a marketing activity based on the marketing strategy and status of an execution environment of the deep reinforcement learning system.

21 Claims, 5 Drawing Sheets

(51) Int. Cl.
*G06N 3/04* (2006.01)
*G06N 3/08* (2006.01)
*G06Q 10/06* (2012.01)

(52) U.S. Cl.
CPC ..... *G06Q 30/0211* (2013.01); *G06Q 30/0215* (2013.01); *G06Q 30/0242* (2013.01); *G06Q 30/0244* (2013.01); *G06Q 30/0246* (2013.01); *G06Q 30/0207* (2013.01); *G06Q 30/0219* (2013.01); *G06Q 30/0249* (2013.01)

(56) References Cited

U.S. PATENT DOCUMENTS

| | | | |
|---|---|---|---|
| 2009/0132395 A1* | 5/2009 | Lam | G06Q 30/0236 705/30 |
| 2015/0310481 A1* | 10/2015 | Brown | G06Q 30/0243 705/14.42 |
| 2018/0060901 A1* | 3/2018 | Lyndon-James | G06Q 30/0242 |
| 2018/0165746 A1* | 6/2018 | Huang | G06Q 30/0282 |
| 2018/0374138 A1* | 12/2018 | Mohamed | G06Q 30/0631 |
| 2019/0019213 A1* | 1/2019 | Silberman | G06Q 30/0243 |
| 2019/0139092 A1* | 5/2019 | Nomula | G06Q 30/0255 |
| 2021/0049622 A1* | 2/2021 | He | G06Q 30/0272 |
| 2021/0049632 A1* | 2/2021 | He | G06Q 30/0211 |

FOREIGN PATENT DOCUMENTS

| | | |
|---|---|---|
| CN | 107292654 | 10/2017 |
| CN | 108280683 | 7/2018 |
| CN | 108305102 | 7/2018 |
| CN | 108322541 | 7/2018 |
| CN | 109087142 | 12/2018 |

OTHER PUBLICATIONS

Cheremukhin, Andrei. "Personalized ad recommendation systems with deep reinforcement learning." (2018). (Year: 2018).*
Wu, Di, et al. "Budget constrained bidding by model-free reinforcement learning in display advertising." Proceedings of the 27th ACM International Conference on Information and Knowledge Management. 2018. (Year: 2018).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2019/091818, dated Sep. 27, 2019, 10 pages (with partial English translation).
PCT International Preliminary Report on Patentability in International Application No. PCT/CN2019/091818, dated Feb. 9, 2021, 10 pages (with English translation).

* cited by examiner

METHOD AND APPARATUS OF DEEP REINFORCEMENT LEARNING FOR MARKETING COST CONTROL

CROSS-REFERENCE TO RELATED APPLICATIONS

This application is a continuation of PCT Application No. PCT/CN2019/091818, filed on Jun. 19, 2019, which claims priority to Chinese Patent Application No. 201810893028.0, filed on Aug. 7, 2018, and each application is hereby incorporated by reference in its entirety.

TECHNICAL FIELD

One or more embodiments of the present specification relate to the field of machine learning, and in particular, to methods and apparatuses of deep reinforcement learning for marketing cost control.

BACKGROUND

A service process of a service scenario needs to consider not only an effect of a service, but also a cost for executing the service. In recommendation marketing scenarios, especially financial marketing scenarios, specific incentives such as coupons are usually provided to users in marketing information, to encourage the users to use financial products. For example, a handling fee coupon for purchasing a fund can be sent to users, to encourage the users to purchase the fund. Clearly, a greater incentive, for example, a larger discount, can indicate a higher possibility that users will use a corresponding financial product. However, an excessive incentive leads to higher marketing costs and even budget overrun.

Therefore, proper solutions are needed to minimize a cost while ensuring a marketing effect.

SUMMARY

One or more embodiments of the present specification describe methods and apparatuses for performing marketing cost control by using deep reinforcement learning, so as to minimize a marketing cost while ensuring a marketing effect.

According to a first aspect, a method for performing marketing cost control by using a deep reinforcement learning system is provided, where the deep reinforcement learning system includes an agent and an execution environment, the agent is configured to determine a marketing behavior based on a marketing strategy and state information of the execution environment, and the method includes the following: determining a cost of the marketing behavior; determining a reward score of reinforcement learning based on at least the cost, so that the reward score is negatively correlated with the cost; and returning the reward score to the agent for the agent to optimize its marketing strategy.

According to some embodiments, the marketing behavior includes releasing a resource package, and the resource package includes at least one of a red envelope, a coupon, or a bill interest-free ticket; and the determining a cost of the marketing behavior includes determining a resource share corresponding to the resource package, and using the resource share as the cost.

According to some embodiments, the determining a reward score of reinforcement learning includes obtaining a function constructed for the cost, and determining the reward score based on at least the function, where the function is constructed as being negatively correlated with the cost.

According to some embodiments, before the determining a reward score of reinforcement learning, the method further includes obtaining, from the execution environment, an execution result generated when a user responds to the marketing behavior determined by the agent, and a targeting effect corresponding to the marketing behavior.

According to some embodiments, the reward score is determined by using a score evaluation function, where the score evaluation function uses the execution result and the cost as variables, and is designed to be positively correlated with a match rate between the execution result and the targeting effect and negatively correlated with the cost of the marketing behavior.

In some other embodiments, a first function constructed based on the execution result is obtained, where the first function is designed to be positively correlated with a match rate between the execution result and the targeting effect; a second function constructed based on the cost is obtained, where the second function is designed to be positively correlated with the cost; and the reward score is determined based on at least the first function and the second function.

Further, in some possible embodiments, the reward score is determined based on a ratio of the first function to the second function; or the reward score is determined based on a difference between the first function and the second function.

In some other possible embodiments, pre-established mapping relationships between reward scores and multiple range combinations formed by multiple value ranges of the first function and multiple value ranges of the second function are obtained; a first range in which the function value of the first function falls is determined based on the execution result, and a second range in which the function value of the second function falls is determined based on the cost, where the first range and the second range form a specific range combination; and a reward score corresponding to the specific range combination is determined based on the mapping relationships.

According to a second aspect, an apparatus for performing marketing cost control by using a deep reinforcement learning system is provided, where the deep reinforcement learning system includes an agent and an execution environment, the agent is configured to determine a marketing behavior based on a marketing strategy and state information of the execution environment, and the apparatus includes the following: a first determining unit, configured to determine a cost of the marketing behavior; a second determining unit, configured to determine a reward score of reinforcement learning based on at least the cost, so that the reward score is negatively correlated with the cost; and a returning unit, configured to return the reward score to the agent for the agent to optimize its marketing strategy.

According to a third aspect, a computer-readable storage medium is provided, where the computer-readable storage medium stores a computer program, and when the computer program runs on a computer, the computer is enabled to perform the method according to the first aspect.

According to a fourth aspect, a computing device is provided, and includes a memory and a processor, where the memory stores executable code, and when executing the executable code, the processor implements the method according to the first aspect.

According to the methods and the apparatuses provided in some embodiments of the present specification, a deep reinforcement learning system is used to perform marketing cost control, and marketing behaviors that can bring conversion and have a minimum cost can be learned for each user, so as to minimize a marketing cost while ensuring user conversion, thereby effectively controlling a total cost.

BRIEF DESCRIPTION OF DRAWINGS

To describe the technical solutions in some embodiments of the present specification more clearly, the following briefly describes the accompanying drawings needed for describing the embodiments. Clearly, the accompanying drawings in the following description show merely some embodiments of the present specification, and a person of ordinary skill in the art can still derive other drawings from these accompanying drawings without creative efforts.

DESCRIPTION OF EMBODIMENTS

The following describes the solutions provided in the present specification with reference to the accompanying drawings.

Figure 1:
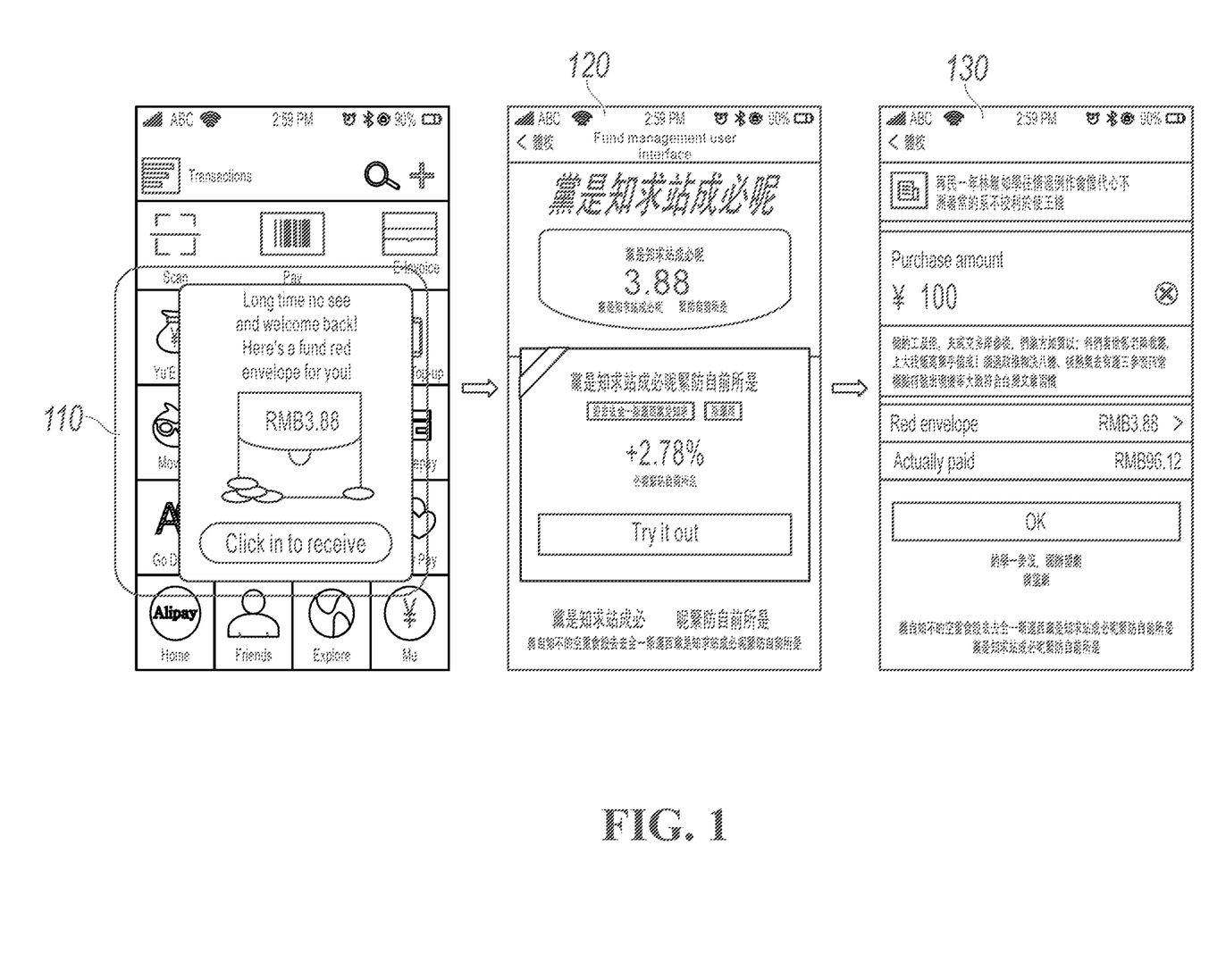
FIG. 1 is a schematic diagram illustrating recommendation marketing execution, according to some embodiments of the present specification.

According to one or more embodiments of the present specification, a deep reinforcement learning method is used to control service costs of recommendation marketing. FIG. 1 is a schematic diagram illustrating recommendation marketing execution, according to some embodiments of the present specification. In recommendation marketing scenarios, a system first selects, based on some recommendation algorithms, some marketing information suitable for a current user to prepare for recommendation. The marketing information can include an advertisement, a resource package (for example, a red envelope, a coupon, and a bill interest-free ticket), and a marketing notification message, etc. Then, the recommendation marketing information is sent to a marketing delivery platform for delivery. As shown in FIG. 1, when a user opens a client device App (for example, ALIPAY), marketing information 110 for obtaining a resource package can be sent to the user. The user can click the message 110 to obtain the resource package, and then jump to a user interface 120 which includes a method for using the resource package. The user can click "try now" in the user interface 120 to enter a new user interface 130 and complete a target operation of the marketing content by using the user interface 130, for example, registering, forwarding, granting a permission to a target application, and using the resource package in the marketing information for consumption. In this case, it can be considered that user conversion is achieved. User conversion is generally an ultimate objective of recommendation marketing.

It can be understood that, marketing service execution generally needs to have a marketing cost controlled within a budget range during consideration of a marketing effect (such as a user conversion rate). A conventional method for controlling a marketing cost includes a constraint solution method, that is, an overall budget is used as a constraint condition to establish a constraint equation set for a solution. With such a method, a new solution is needed when the budget is changed, and how to coordinate local and global optima becomes a problem difficult to solve. In addition, there are also independent cost control methods, such as budget smoothing for advertisements. A basic idea of budget smoothing is preventing excessively fast budget consumption, because later users may also have conversion intentions. Therefore, traffic needs to be predicted to update current consumption in real time, and whether to deliver advertisements needs to be comprehensively considered based on a traffic estimate, a budget balance, and a user conversion possibility. This method generates heavy workload.

Further, it is usually expected that the marketing cost is minimized while the marketing cost is controlled within the budget range. For example, during marketing, an RMB5 red envelope is delivered to some users to achieve user conversion. However, for some users, user conversion can be achieved even by delivering merely an RMB2 red envelope or no cash red envelope. Therefore, delivering the RMB5 red envelope to these users undoubtedly causes a waste of the cost.

Based on the above-mentioned consideration, some embodiments of the present specification propose a solution of using a deep reinforcement learning system to perform marketing cost control. A basic idea of such a solution is as follows: Marketing behaviors that can bring conversion and have a minimum cost can be learned for each user, so as to minimize a marketing cost while ensuring user conversion, thereby effectively controlling a total cost.

Figure 2A:
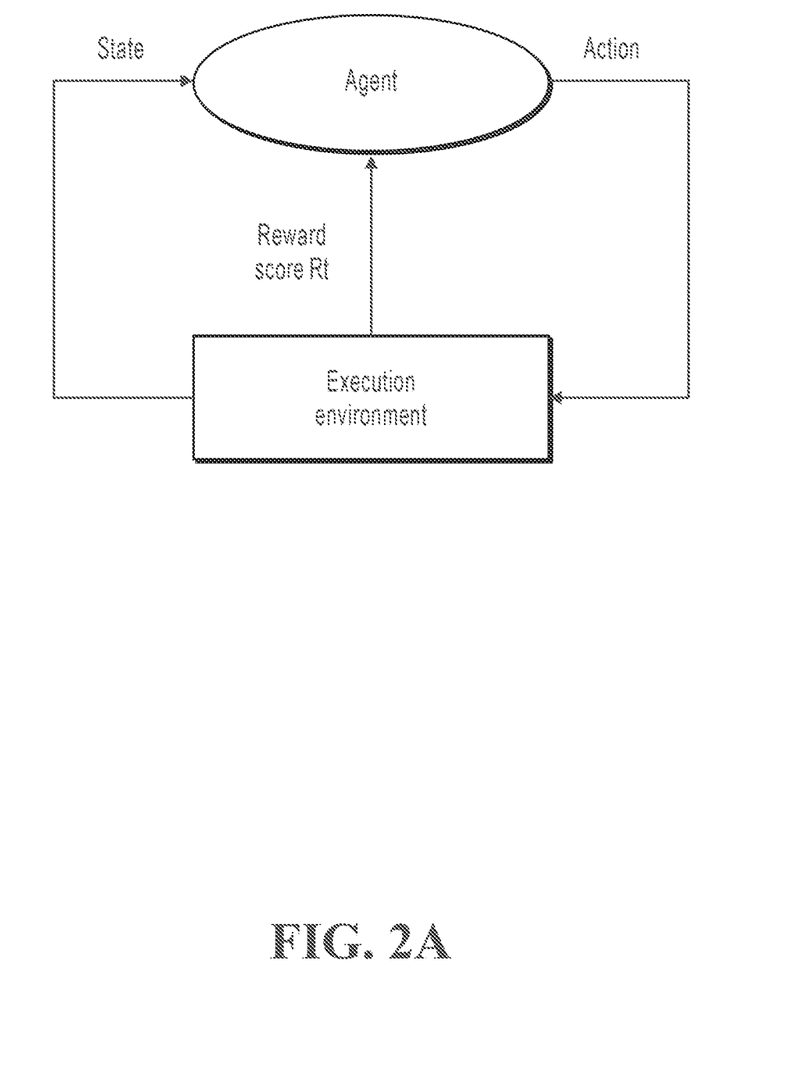
FIG. 2A illustrates a typical deep reinforcement learning system.

FIG. 2A illustrates a typical deep reinforcement learning system. Generally, the deep reinforcement learning system includes an agent and an execution environment, and the agent continuously learns and optimizes its strategy through interaction and feedback with the execution environment. Specifically, the agent observes and obtains a state of the execution environment, and determines, based on a certain strategy and the state of the execution environment, a behavior or an action to take. Such a behavior affects the execution environment, changes the state of the execution environment, and generates feedback to the agent. The feedback is also referred to as a reward score. Based on the obtained reward score, the agent determines whether the above-mentioned behavior is correct and whether the strategy needs to be adjusted, so as to update its strategy. The agent can continuously update the strategy by constantly observing a state, determining a behavior, and receiving feedback. An ultimate objective is to learn a strategy, so that the obtained reward score is maximized. The above-mentioned description is a typical reinforcement learning process. During strategy learning and adjustment, if the agent uses some deep learning algorithms including a neural network algorithm, such a system is referred to as a deep reinforcement learning system.

Figure 2B:
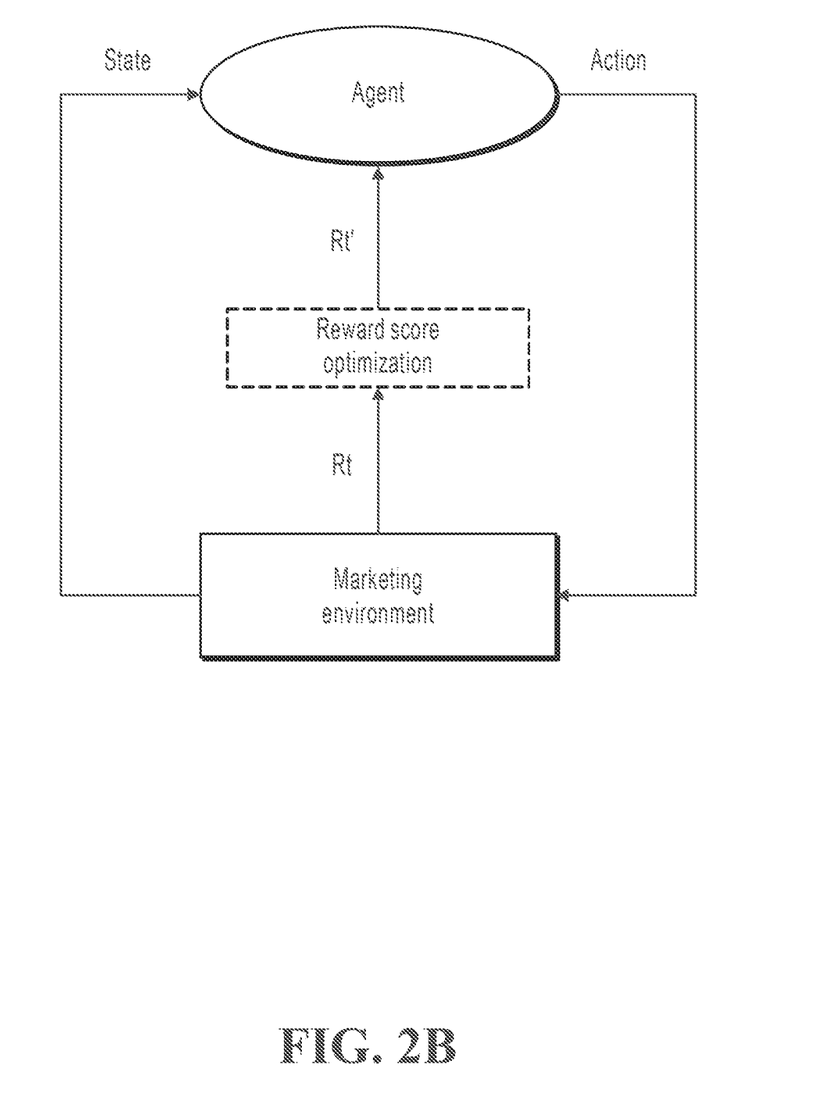
FIG. 2B illustrates a deep reinforcement learning-based recommendation marketing system, according to some embodiments.

FIG. 2B illustrates a deep reinforcement learning-based recommendation marketing system, according to some embodiments. To be specific, deep reinforcement learning is applied to a recommendation marketing system. In recommendation marketing scenarios, the execution environment is a recommendation marketing environment, and an observable environment state includes to-be-recommended marketing information and current user information, etc. The agent determines an appropriate marketing behavior based on some marketing strategies and a current state of the marketing environment. The marketing behavior changes the status of the marketing environment and generates a reward score, which is fed back to the agent. The agent can further adjust and update its marketing strategy based on the reward score. According to one or more embodiments of the present specification, a reward score generation process is optimized, and the reward score is determined based on at least a cost of the marketing behavior, thereby controlling the marketing behavior cost (which can be referred to as the marketing cost). Further, a comprehensive reward score can be determined with reference to an execution result (for example, clicking, receive, or conversion) generated when a user responds to the marketing behavior. As such, the marketing cost can be directly considered in consideration of a marketing effect, without separately designing different methods or separately building models for the marketing effect and the marketing cost. In addition, in some embodiments of the present specification, marketing behaviors that can bring conversion and have a relatively low cost can be selected for different users based on an idea that different people have different characteristics. Therefore, the marketing cost can be minimized while user conversion is ensured. On the other hand, when consumption and traffic of a market budget change, impact on recommendation is little and stability is better. The following describes some implementations of the above-mentioned idea.

Figure 3:
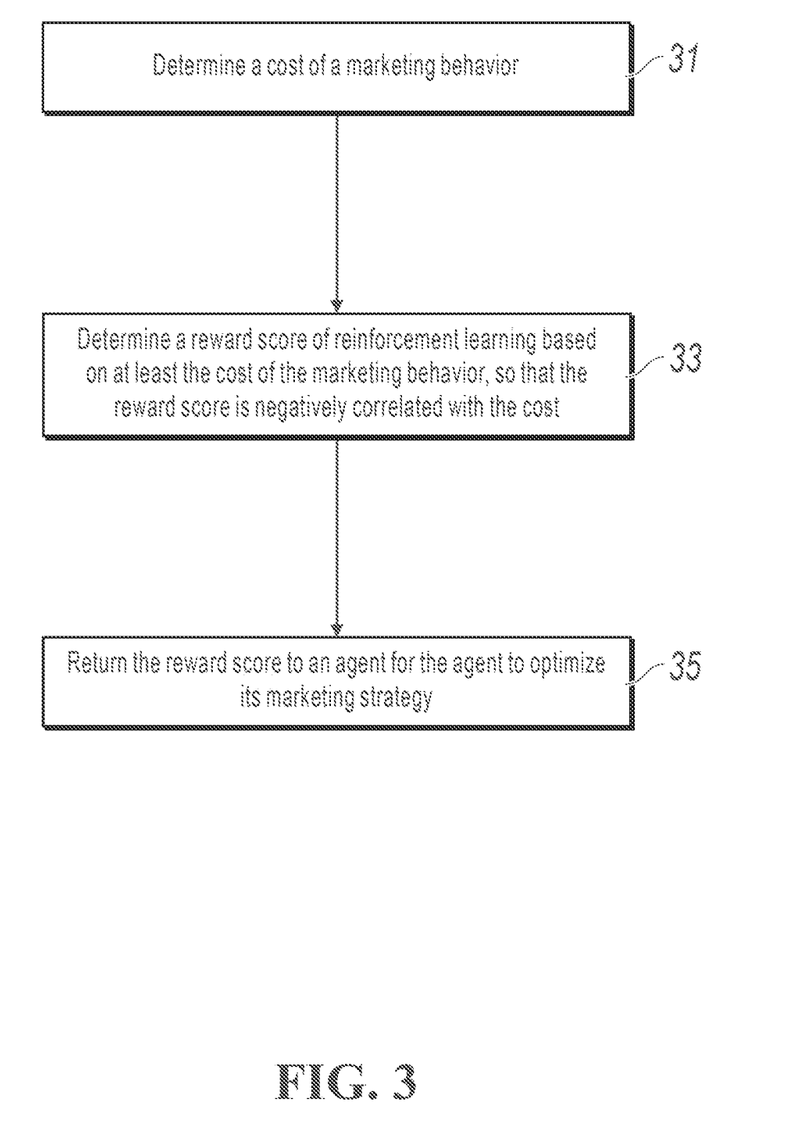
FIG. 3 illustrates a method for performing marketing cost control by using a deep reinforcement learning system, according to some embodiments.

FIG. 3 illustrates a method for performing marketing cost control by using a deep reinforcement learning system, according to some embodiments. It can be understood that the deep reinforcement learning system can be the deep reinforcement learning-based recommendation marketing system shown in FIG. 2B. The deep reinforcement learning system includes an agent and an execution environment. The agent is configured to determine a marketing behavior based on a marketing strategy and a state of the execution environment, and update the marketing strategy based on a reward score fed back for the marketing behavior. The method can be performed by any apparatus, device, platform, or device cluster, etc. that has data computing and processing capabilities. As shown in FIG. 3, the method includes at least the following: step 31: determining a cost of the marketing behavior; step 33: determining a reward score of reinforcement learning based on at least the cost of the marketing behavior, so that the reward score is negatively correlated with the cost; and step 35: returning the reward score to the agent for the agent to optimize its marketing strategy. The following describes specific implementations of the above-mentioned steps.

As described above, in the deep reinforcement learning-based recommendation marketing system, the agent continuously observes and obtains a current state of the recommendation marketing environment, and determines, based on the marketing strategy, a marketing behavior to take in the current state. In some implementations, state information of the marketing environment obtained by the agent can include optional marketing information and user information of a current user. More specifically, the optional marketing information can include optional marketing content, such as an alternative advertisement, a credit package (such as a red envelope, a shopping voucher, and a coupon), and a marketing notification message. The optional marketing information can further include optional marketing channels, such as a message sending, an advertisement banner, and a badge reminder. On the other hand, the state information of the marketing environment further includes the user information of the current user, and the user information can include user attribute characteristics, such as a registration time period, an age, a gender, and an income. In some embodiments, the user information further includes the user's historical behavior information, such as a historical operation sequence, a list of recently browsed user interfaces, and a list of recently accepted marketing information. In some embodiments, the user information can include user profile information. It can be understood that, in some implementations, a corresponding user profile is granted to the user based on some algorithms, and basic attribute information and/or historical behavior information of the user. The user profile information can include, for example, a crowd label for classifying the user into a specific crowd based on attribute information, a cluster label for clustering the user, and a user behavior habit label constructed based on historical user behaviors, etc. The various user information can form a user feature of the current user.

In some specific examples, a state vector of the current state of the marketing environment is constructed based on a marketing feature corresponding to the marketing information and the user feature corresponding to the current user, and then is input to the agent. Based on some marketing strategies and the current state of the marketing environment, the agent determines the marketing behavior to take.

It can be understood that, for the reinforcement learning system, a strategy in the agent is used to map the state of the environment to the next behavior. In the deep reinforcement learning-based recommendation marketing system shown in FIG. 2B, the agent is an entity that makes a decision, and maps, based on the marketing strategy, the current state of the marketing environment to the next marketing behavior to take. The marketing strategy is implemented by using complex deep learning algorithms, such as Q-learning and DQN. These algorithms generally include some deep neural network structures. As described above, the current state of the marketing environment reflects the user feature of the current user and a feature of the optional marketing information. Once obtaining such current state information, the agent can determine, by using a deep learning algorithm, the marketing behavior to take for the current user, for example, determine specific marketing content and a specific channel used to send the marketing content to the user.

Such a marketing behavior can affect the execution environment. Therefore, in step 31, the cost of the marketing behavior that affects the execution environment can be determined.

In some embodiments, the marketing behavior includes delivering marketing information. In some specific embodiments, the marketing information can be classified into a notification message or a user interface advertisement, etc. based on different delivery channels of the marketing information. The notification message can include a marketing notification message that can be actively sent to a user terminal in any time period. A user can click the notification message to enter a corresponding App user interface or website user interface, and the user interface advertisement can include a marketing advertisement displayed in a central GUI area within a limited time period in which the user uses an App or browses a website. Generally, marketing information has different costs due to different delivery channels. For example, a cost of delivering a user interface advertisement is higher than a cost of sending a notification message. Therefore, a delivery cost can be determined based on the delivery channel of the marketing information, and the delivery cost can be used as a corresponding marketing cost.

In some embodiments, the marketing behavior can include releasing a resource package. In some specific embodiments, the resource package can be separately released. Correspondingly, the determining a cost of the marketing behavior can include determining a resource share corresponding to the resource package, and using the resource share as the cost of the marketing behavior. In some examples, the resource package is a cash red envelope, and therefore, a specific amount of the cash red envelope, such as RMB2 or RMB5, can be determined as the marketing cost. In some other examples, the resource package is a coupon, and therefore, a discount amount corresponding to the coupon can be determined as the marketing cost. For example, the discount amount of the coupon can be determined based on specific bill information. For example, if a coupon for 12% off is used on a costume priced at RMB1000, a discount is RMB120, and RMB120 is a corresponding marketing cost. In still some other examples, the resource package is a bill interest-free ticket, and is used to exempt a user from a payment handling fee when the user pays a bill in installments. Therefore, an exempted amount corresponding to the bill interest-free ticket can be determined as a marketing cost.

In some other specific embodiments, the resource package can be embedded in the marketing information, and jointly sent to the user, so that the user can click a resource package link in the marketing information to obtain the corresponding resource package when browsing the marketing information. In this case, a delivery cost of the marketing information and a resource cost corresponding to the resource package in the marketing information can be determined, and a sum of the two costs can be used as the cost of the marketing behavior, or only the delivery cost or the resource cost can be used as the marketing cost.

For the determined cost of the marketing behavior, in step 33, the reward score of reinforcement learning can be determined based on at least the cost of the marketing behavior, so that the reward score is negatively correlated with the cost.

In some embodiments, at least the cost of the marketing behavior is used as a variable to construct a function for determining the reward score. The function is designed to be negatively correlated with the marketing cost, that is, a higher marketing cost can indicate a smaller output value of the function, namely, a lower reward score.

The function is as follows: Rt=F(cost) (1) cost is the cost of the marketing behavior. The function F is designed as follows: A lower cost can indicate a higher Rt score.

Further, the function F can further include another variable X as follows: Rt=F(cost, X) (2)

X can be a variable related to a marketing effect. Correspondingly, the function F can be designed to be positively correlated with the marketing effect and negatively correlated with the cost, that is, a better marketing effect can indicate a lower cost and a larger output value of F.

In some embodiments, the marketing effect is measured by a match rate between the execution result of the user and a predetermined targeting effect. Therefore, before the reward score of reinforcement learning is determined, the execution result generated when the user responds to the marketing behavior determined by the agent and a targeting effect corresponding to the marketing behavior further need to be obtained from the execution environment, where a higher match rate between the execution result and the targeting effect can indicate a better corresponding marketing effect. In some examples, the targeting effect can be implemented as user conversion, and the execution result can be "the user is converted" or "the user is not converted". Therefore, compared with "the user is not converted", the execution result of "the user is converted" has a higher rate of matching with the targeting effect, and a corresponding marketing effect is better.

In some examples, X can be an execution result corresponding to a targeting effect. Correspondingly, the function F can alternatively be designed to be positively correlated with a match rate between the execution result and the targeting effect, and a higher rate of matching can indicate a higher Rt score.

In some other embodiments, a first function f1 can be constructed based on the execution result, and the first function is designed to be positively correlated with the match rate between the execution result and the targeting effect. In addition, a second function f2 is constructed based on the cost of the marketing behavior, and the second function is designed to be positively correlated with the cost. The reward score is then determined based on the first function and the second function.

In some specific embodiments, the reward score can be determined based on a ratio of the first function f1 to the second function f2: Rt=f1(X)/f2(cost) (3) f1(X) is the first function, and f2(cost) is the second function. When an output value of f1(X) remains unchanged, a smaller cost can indicate a smaller value of f2 (cost) and accordingly a higher reward score. Conversely, a larger cost can indicate a lower reward score accordingly. Therefore, by determining the reward score by using equation (3), the cost can be controlled while the marketing effect is controlled.

In some examples, a weight can be assigned to either of f1(X) and f2(cost) to increase or reduce importance of the function, for example, a weight can be assigned to f2(cost) as follows: Rt=f1(X)/αf2(cost) (4) α is a weight value, and when α is greater than 1, a proportion of the cost is increased in determining the reward score.

In some other specific embodiments, the reward score can be determined based on a difference between the first function f1 and the second function f2 as follows: Rt=f1(X)−f2(cost) (5)

In some examples, a weight can be assigned to either of f1(X) and f2(cost) to increase or reduce importance of the function, for example, a weight can be assigned to f1(X) as follows: Rt=βf1(X)−f2(cost) (6)

β is a weight value, and when β is less than 1, a proportion of the marketing effect is reduced in determining the reward score.

In still some other specific embodiments, pre-established mapping relationships between reward scores and multiple range combinations formed by multiple value ranges of the first function and multiple value ranges of the second function are obtained. Then, a first range in which a function value of the first function falls is determined based on the execution result, and a second range in which a function value of the second function falls is determined based on the cost, where the first range and the second range form a specific range combination. A corresponding reward score is further determined based on the mapping relationships.

In some specific examples, the pre-established mapping relationships can be as follows:

$$R_t = \begin{cases} A \text{ if } f(x) \in (a, b] \text{ and } f(\text{cost}) \in (h, i] \\ B \text{ if } f(x) \in (b, c] \text{ and } f(\text{cost}) \in (i, j] \\ C \text{ if } f(x) \in (c, d] \text{ and } f(\text{cost}) \in (j, k] \\ \dots \text{ if } \dots \end{cases} \quad (7)$$

a, b, c, d, h, i, j, k, A, B, and C are constants, and corresponding specific values can be adjusted based on experience.

It should be understood that, equations (3) to (7) are merely several examples for determining the reward score based on the first function and the second function. The reward score function Rt constructed based on the first function and the second function only needs to be positively correlated with the match rate between the execution result and the targeting effect and negatively correlated with the cost of the marketing behavior.

The reward score of reinforcement learning is determined based on the cost of the marketing behavior. Therefore, in step 35, the reward score is returned to the agent for the agent to optimize its marketing strategy.

As described above, the agent continuously obtains feedback of the reward score from the environment to determine whether the above-mentioned marketing strategy and marketing behavior are appropriate, thereby optimizing the marketing strategy. It should be noted that, optimizing the marketing strategy here includes not only modifying or adjusting the above-mentioned marketing strategy when it is determined that the delivered marketing behavior is improper, but also enhancing or maintaining an original marketing strategy when it is determined that the marketing behavior has a good effect. In one or more embodiments of the present specification, as determining the reward score takes the user cost into account, the cost of the marketing behavior can be controlled. In some implementations, the execution result generated when the user responds to the marketing behavior can further be considered in the determining of the reward score. As such, the marketing effect and the marketing cost can both be controlled, without separately designing different methods or separately building models for the marketing effect and the marketing cost. In addition, in some embodiments of the present specification, marketing behaviors that can bring conversion and have a relatively low cost can be selected for different users based on an idea that different people have different characteristics. Therefore, the marketing cost can be minimized while user conversion is ensured. On the other hand, when consumption and traffic of a market budget change, impact on recommendation is little and stability is better.

According to another aspect, some embodiments of the present specification further provide an apparatus. The apparatus is applied to a system that performs marketing cost control by using deep reinforcement learning. As shown in FIG. 2B, a deep reinforcement learning system includes an agent and an execution environment, and the agent is configured to determine a marketing behavior based on a marketing strategy and state information of the execution environment. The apparatus can be implemented by any software, hardware, or hardware and software combination that has computing and processing capabilities. In some embodiments, the apparatus can be integrated into the execution environment of the deep reinforcement learning system. In some other embodiments, the apparatus can be integrated into an entity apparatus for implementing the agent in the deep reinforcement learning system. In still some other embodiments, the apparatus is used as an independent apparatus to extract data from the execution environment for processing to obtain a reward score and return the reward score to the agent.

Figure 4:
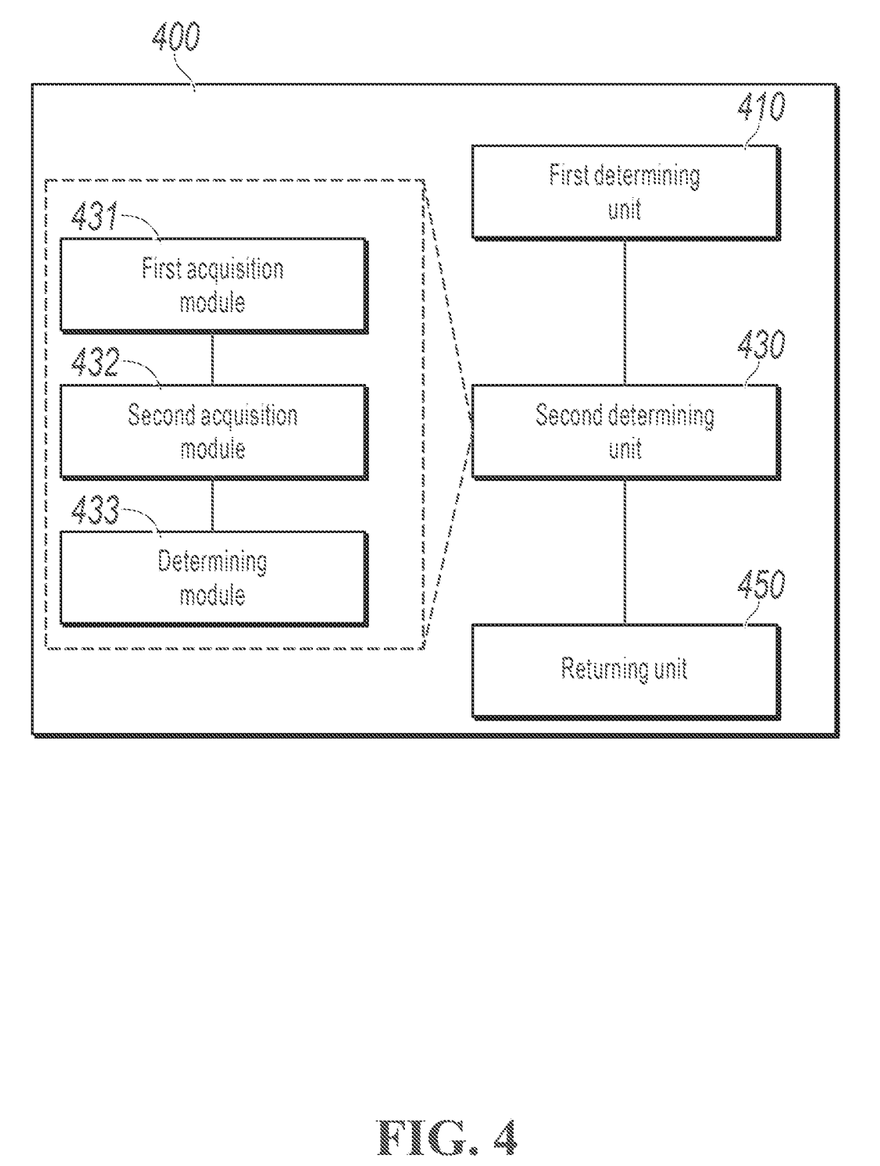
FIG. 4 is a schematic block diagram illustrating an apparatus, according to some embodiments.

FIG. 4 is a schematic block diagram illustrating an apparatus, according to some embodiments. As shown in FIG. 4, the apparatus 400 includes a first determining unit 410, configured to determine a cost of the marketing behavior; a second determining unit 430, configured to determine a reward score of reinforcement learning based on at least the cost, so that the reward score is negatively correlated with the cost; and a returning unit 450, configured to return the reward score to the agent for the agent to optimize its marketing strategy.

According to some embodiments, the marketing behavior includes releasing a resource package, and the resource package includes at least one of a red envelope, a coupon, or a bill interest-free ticket; and the first determining unit 410 is configured to determine a resource share corresponding to the resource package, and use the resource share as the cost.

According to some embodiments, the second determining unit 430 is configured to obtain a function constructed for the cost, and determine the reward score based on at least the function, where the function is constructed as being negatively correlated with the cost.

According to some embodiments, the first determining unit 410 is configured to obtain, from the execution environment, an execution result generated when a user responds to the marketing behavior determined by the agent, and a targeting effect corresponding to the marketing behavior.

Further, in some specific embodiments, the second determining unit 430 is configured to determine the reward score by using a score evaluation function, where the score evaluation function uses the execution result and the cost as variables, and is designed to be positively correlated with a match rate between the execution result and the targeting effect and negatively correlated with the cost of the marketing behavior.

In some other specific embodiments, the second determining unit 430 includes a first acquisition module 431, configured to obtain a first function constructed based on the execution result, where the first function is designed to be positively correlated with a match rate between the execution result and the targeting effect; a second acquisition module 432, configured to obtain a second function constructed based on the cost, where the second function is designed to be positively correlated with the cost; and a determining module 433, configured to determine the reward score based on at least the first function and the second function.

Furthermore, in some examples, the determining module 433 is configured to determine the reward score based on a ratio of the first function to the second function; or determine the reward score based on a difference between the first function and the second function.

In some other examples, the determining module 433 is configured to obtain pre-established mapping relationships between reward scores and multiple range combinations formed by multiple value ranges of the first function and multiple value ranges of the second function; determine, based on the execution result, a first range in which a function value of the first function falls, and determine, based on the cost, a second range in which a function value of the second function falls, where the first range and the second range form a specific range combination; and determine a reward score corresponding to the specific range combination based on the mapping relationships.

The second determining unit 430 determines the reward score based on at least the marketing cost. Therefore, when optimizing its marketing strategy, the agent can learn marketing behaviors that can bring conversion and have a minimum cost for each user, so as to minimize the marketing cost while ensuring user conversion, thereby effectively controlling a total cost.

According to embodiments of still another aspect, a computer-readable storage medium is further provided, where the computer-readable storage medium stores a computer program, and when the computer program runs on a computer, the computer is enabled to perform the method described in FIG. 3.

According to embodiments of yet another aspect, a computing device is further provided, and includes a memory and a processor, where the memory stores executable code, and when executing the executable code, the processor implements the method described with reference FIG. 3.

A person skilled in the art should be aware that in the above-mentioned one or more examples, functions described in the present specification can be implemented by hardware, software, firmware, or any combination thereof. When the present specification is implemented by software, the functions can be stored in a computer readable medium or transmitted as one or more instructions or code in the computer readable medium.

The objectives, technical solutions, and beneficial effects of the present specification are further described in detail in the above-mentioned specific implementations. It should be understood that the above-mentioned descriptions are merely specific implementations of the present specification, but are not intended to limit the protection scope of the present specification. Any modification, equivalent replacement, or improvement made based on the technical solutions of the present specification shall fall within the protection scope of the present specification.

What is claimed is:

1. A computer-implemented method, comprising:
    determining, by a deep reinforcement learning system, a cost of a resource and a delivery method of the resource, wherein the deep reinforcement learning system comprises a smart agent that utilizes one or more computer-implemented neural network algorithms and a computer-implemented execution environment communicably coupled to the smart agent;
    determining, by the computer-implemented execution environment, an execution result generated in response to a user responding to the resource and the delivery method of the resource, wherein the resource and the delivery method of the resource is determined by the smart agent;
    obtaining, by the computer-implemented execution environment, a targeted effect corresponding to the resource and the delivery method of the resource determined by the smart agent;
    constructing, by the computer-implemented execution environment and based on the execution result, a first function that is positively correlated to a match rate between the execution result and the targeted effect and negatively correlated to the cost;
    determining, by the computer-implemented execution environment, a reward score of reinforcement learning based on the first function;
    returning, by the computer-implemented execution environment, the reward score to the smart agent;
    determining, by the smart agent, a strategy of determining the resource and the delivery method of the resource based on the reward score;
    based on the strategy and status of the computer-implemented execution environment of the deep reinforcement learning system, updating, by the smart agent and using a deep learning algorithm, the resource and the delivery method of the resource and providing the updated resource and updated delivery method of the resource as feedback to the computer-implemented execution environment; and
    sending, by the computer-implemented execution environment, the updated resource based on the updated delivery method of the resource, to a computer platform for delivery to one or more users.

2. The computer-implemented method according to claim 1, wherein the delivery method comprises releasing a resource package, and the resource package comprises at least one of a monetary gift, a coupon, or interest-free installments; and the cost of the delivery method is determined as a resource share corresponding to the resource package.

3. The computer-implemented method according to claim 1, wherein the reward score of the deep reinforcement learning system is determined based on a function generated to be negatively correlated to the cost.

4. The computer-implemented method according to claim 1, wherein the reward score the deep reinforcement learning system is determined by using a score evaluation function, wherein the score evaluation function uses the execution result and the cost as variables, and is positively correlated with a match rate between the execution result and the targeted effect and negatively correlated with the cost.

5. The computer-implemented method according to claim 1 further comprising:
    obtaining, by the computer-implemented execution environment, a second function generated based on the cost, wherein the second function is positively correlated with the cost; and
    wherein determining, by the computer-implemented execution environment, the reward score based on the first function comprises: determining, by the computer-implemented execution environment, the reward score based on at least the first function and the second function.

6. The computer-implemented method according to claim 5, wherein the reward score is determined based on a ratio or a difference between the first function and the second function.

7. The computer-implemented method according to claim 5, wherein the determining the reward score, by the computer-implemented execution environment, based on at least the first function and the second function comprises:
    obtaining, by the computer-implemented execution environment, predetermined mapping relationships between a plurality of reward scores and a plurality of range combinations formed by a plurality of value ranges of the first function and a plurality of value ranges of the second function;
    determining, by the computer-implemented execution environment and based on the execution result, a first range that a function value of the first function falls;
    determining, by the computer-implemented execution environment and based on the cost, a second range that a function value of the second function falls, wherein the first range and the second range form a range combination; and
    determining, by the computer-implemented execution environment, the reward score corresponding to the range combination based on the predetermined mapping relationships.

8. A non-transitory, computer-readable medium storing one or more instructions executable by a computer system to perform operations comprising:
    determining, by a deep reinforcement learning system, a cost of a resource and a delivery method of the resource, wherein the deep reinforcement learning system comprises a smart agent that utilizes one or more computer-implemented neural network algorithms and a computer-implemented execution environment communicably coupled to the smart agent;

determining, by the computer-implemented execution environment, an execution result generated in response to a user responding to the resource and the delivery method of the resource, wherein the resource and the delivery method of the resource is determined by the smart agent;

obtaining, by the computer-implemented execution environment, a targeted effect corresponding to the resource and the delivery method of the resource determined by the smart agent;

constructing, by the computer-implemented execution environment and based on the execution result, a first function that is positively correlated to a match rate between the execution result and the targeted effect and negatively correlated to the cost;

determining, by the computer-implemented execution environment, a reward score of reinforcement learning based on the first function;

returning, by the computer-implemented execution environment, the reward score to the smart agent;

determining, by the smart agent, a strategy of determining the resource and the delivery method of the resource based on the reward score; and based on the strategy and status of the computer-implemented execution environment of the deep reinforcement learning system, updating, by the smart agent and using a deep learning algorithm, the resource and the delivery method of the resource and providing the update as feedback to the computer-implemented execution environment; and sending, by the computer-implemented execution environment, the updated resource based on the updated delivery method of the resource, to a computer platform for delivery to one or more users.

9. The non-transitory, computer-readable medium according to claim 8, wherein the delivery method comprises releasing a resource package, and the resource package comprises at least one of a monetary gift, a coupon, or interest-free installments; and the cost of the delivery method is determined as a resource share corresponding to the resource package.

10. The non-transitory, computer-readable medium according to claim 8, wherein the reward score the deep reinforcement learning system is determined based on a function generated to be negatively correlated to the cost.

11. The non-transitory, computer-readable medium according to claim 8, wherein the reward score of the deep reinforcement learning system is determined by using a score evaluation function, wherein the score evaluation function uses the execution result and the cost as variables, and is positively correlated with a match rate between the execution result and the targeted effect and negatively correlated with the cost.

12. The non-transitory, computer-readable medium according to claim 8, wherein the operations further comprises:

obtaining, by the computer-implemented execution environment, a second function generated based on the cost, wherein the second function is positively correlated with the cost; and wherein determining, by the computer-implemented execution environment, the reward score based on the first function comprises: determining, by the computer-implemented execution environment, the reward score based on at least the first function and the second function.

13. The non-transitory, computer-readable medium according to claim 12, wherein the reward score is determined based on a ratio or a difference between the first function and the second function.

14. The non-transitory, computer-readable medium according to claim 12, wherein the determining the reward score, by the computer-implemented execution environment, based on at least the first function and the second function comprises:

obtaining, by the computer-implemented execution environment, predetermined mapping relationships between a plurality of reward scores and a plurality of range combinations formed by a plurality of value ranges of the first function and a plurality of value ranges of the second function;

determining, by the computer-implemented execution environment and based on the execution result, a first range that a function value of the first function falls;

determining, by the computer-implemented execution environment and based on the cost, a second range that a function value of the second function falls, wherein the first range and the second range form a range combination; and determining, by the computer-implemented execution environment, the reward score corresponding to the range combination based on the predetermined mapping relationships.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

determining, by a deep reinforcement learning system, a cost of a resource and a delivery method of the resource, wherein the deep reinforcement learning system comprises a smart agent that utilizes one or more computer-implemented neural network algorithms and a computer-implemented execution environment communicably coupled to the smart agent;

determining, by the computer-implemented execution environment, an execution result generated in response to a user responding to the resource and the delivery method of the resource, wherein the resource and the delivery method of the resource is determined by the smart agent;

obtaining, by the computer-implemented execution environment, a targeted effect corresponding to the resource and the delivery method of the resource determined by the smart agent;

constructing, by the computer-implemented execution environment and based on the execution result, a first function that is positively correlated to a match rate between the execution result and the targeted effect and negatively correlated to the cost;

determining, by the computer-implemented execution environment, a reward score of reinforcement learning based on the first function;

returning, by the computer-implemented execution environment, the reward score to the smart agent;

determining, by the smart agent, a strategy of determining the resource and the delivery method of the resource based on the reward score; and based on the strategy and status of the computer-implemented execution environment of the deep reinforcement learning system, updating, by the smart agent and using a deep learning algorithm, the resource and the delivery method of the resource and providing the update as feedback to the computer-implemented execution environment; and sending, by the computer-implemented execution environment, the updated resource based on the updated delivery method of the resource, to a computer platform for delivery to one or more users.

16. The computer-implemented system according to claim 15, wherein the delivery method comprises releasing a resource package, and the resource package comprises at least one of a monetary gift, a coupon, or interest-free installments; and the cost of the delivery method is determined as a resource share corresponding to the resource package.

17. The computer-implemented system according to claim 15, wherein the reward score of the deep reinforcement learning system is determined based on a function generated to be negatively correlated to the cost.

18. The computer-implemented system according to claim 15, wherein the reward score of the deep reinforcement learning system is determined by using a score evaluation function, wherein the score evaluation function uses the execution result and the cost as variables, and is positively correlated with a match rate between the execution result and the targeted effect and negatively correlated with the cost.

19. The computer-implemented system according to claim 15, wherein the operations further comprises:

obtaining, by the computer-implemented execution environment, a second function generated based on the cost, wherein the second function is positively correlated with the cost; and wherein determining, by the computer-implemented execution environment, the reward score based on the first function comprises: determining, by the computer-implemented execution environment, the reward score based on at least the first function and the second function.

20. The computer-implemented system according to claim 19, wherein the reward score is determined based on a ratio or a difference between the first function and the second function.

21. The computer-implemented system according to claim 19, wherein the determining the reward score based on at least the first function and the second function comprises:

wherein the determining the reward score, by the computer-implemented execution environment, based on at least the first function and the second function comprises:

obtaining, by the computer-implemented execution environment, predetermined mapping relationships between a plurality of reward scores and a plurality of range combinations formed by a plurality of value ranges of the first function and a plurality of value ranges of the second function;

determining, by the computer-implemented execution environment and based on the execution result, a first range that a function value of the first function falls;

determining, by the computer-implemented execution environment and based on the cost, a second range that a function value of the second function falls, wherein the first range and the second range form a range combination; and determining, by the computer-implemented execution environment, the reward score corresponding to the range combination based on the predetermined mapping relationships.

* * * * *

UNITED STATES PATENT AND TRADEMARK OFFICE
CERTIFICATE OF CORRECTION

| | |
|---|---|
| PATENT NO. | : 11,295,332 B2 |
| APPLICATION NO. | : 17/083087 |
| DATED | : April 5, 2022 |
| INVENTOR(S) | : Jianshan He |

It is certified that error appears in the above-identified patent and that said Letters Patent is hereby corrected as shown below:

In the Claims

Column 12, Line 19, in Claim 4, after "score" insert -- of --.

Column 13, Line 48, in Claim 10, after "score" insert -- of --.

Signed and Sealed this
Twenty-eighth Day of June, 2022

Katherine Kelly Vidal
*Director of the United States Patent and Trademark Office*